(12) United States Patent
Strope

(10) Patent No.: US 7,013,626 B1
(45) Date of Patent: Mar. 21, 2006

(54) WALK BEHIND MOWER

(75) Inventor: Claude Strope, Nebraska City, NE (US)

(73) Assignee: Auburn Consolidated Industries, Inc., Auburn, NE (US)

( * ) Notice: Subject to any disclaimer, the term of this patent is extended or adjusted under 35 U.S.C. 154(b) by 0 days.

(21) Appl. No.: 10/841,791

(22) Filed: May 7, 2004

Related U.S. Application Data

(60) Provisional application No. 60/488,533, filed on Jul. 18, 2003.

(51) Int. Cl.
*A01D 34/03* (2006.01)
*A01D 34/43* (2006.01)
*A01D 34/64* (2006.01)

(52) U.S. Cl. ...................................... 56/15.8

(58) Field of Classification Search ................. 56/14.7, 56/14.9, 15.9, 16.3, 16.7, 17.1, 255, 320.1, 56/320.2, 15.8
See application file for complete search history.

(56) References Cited

U.S. PATENT DOCUMENTS

| 2,810,251 | A | * | 10/1957 | Shippey ........................ 56/17.1 |
| 2,848,859 | A | | 8/1958 | Abel |
| 3,445,991 | A | * | 5/1969 | Deptula et al. ............... 56/11.8 |
| 3,512,344 | A | | 5/1970 | Kortum |
| 4,120,136 | A | * | 10/1978 | Rose ............................ 56/17.1 |
| 4,437,205 | A | * | 3/1984 | Koland ......................... 15/354 |
| 4,525,989 | A | * | 7/1985 | Lane et al. ................... 56/17.4 |
| 4,840,020 | A | | 6/1989 | Oka |
| 5,138,825 | A | | 8/1992 | Trefz et al. |
| 5,351,467 | A | | 10/1994 | Trefz et al. |
| 5,381,648 | A | | 1/1995 | Seegert et al. |
| 5,526,633 | A | | 6/1996 | Strong et al. |
| 5,697,455 | A | | 12/1997 | Deckler |
| 5,784,870 | A | | 7/1998 | Seegert et al. |
| 5,797,252 | A | | 8/1998 | Goman |
| 5,816,033 | A | | 10/1998 | Busboom et al. |
| 5,867,970 | A | | 2/1999 | Ehrhart et al. |
| 6,041,584 | A | | 3/2000 | Hohnl |
| 6,212,863 | B1 | * | 4/2001 | Thomas ........................ 56/17.2 |
| 6,412,258 | B1 | | 7/2002 | Doerflinger |
| 6,427,430 | B1 | * | 8/2002 | Swartzendruber ........... 56/16.3 |
| 6,494,028 | B1 | | 12/2002 | Moore |
| 6,588,188 | B1 | * | 7/2003 | Dennis ......................... 56/16.3 |
| 6,729,116 | B1 | * | 5/2004 | Graus et al. .................. 56/17.2 |
| 6,837,032 | B1 | * | 1/2005 | Swartzendruber et al. ... 56/14.9 |
| 2002/0035825 | A1 | * | 3/2002 | Swartzendruber ........... 56/16.3 |

* cited by examiner

*Primary Examiner*—Árpád Fábián Kovács
(74) *Attorney, Agent, or Firm*—Dicke, Billig & Czaja

(57) ABSTRACT

A deck height adjustment apparatus for a walk-behind mower includes a foot pedal actuated lever operably connected to a deck lift mechanism for raising and lowering a mowing deck. A cam wheel, having an outer edge of a varying radius relative to an axis of rotation, is mounted to a mower body proximate the lever. The deck height is a function of the radius of the outer edge of the cam wheel in contact with the lever. An adjustment mechanism for setting the deck height is conveniently located on a handle of the walk-behind mower.

25 Claims, 8 Drawing Sheets

WALK BEHIND MOWER

CROSS-REFERENCE TO RELATED APPLICATION(S)

Priority is claimed under U.S. Provisional Application No. 60/488,533, entitled Walk Behind Mower, and filed Jul. 18, 2003, which is incorporated herein by reference in its entirety.

BACKGROUND OF THE INVENTION

The present invention relates to walk-behind mowers with mechanisms for adjusting the deck height and drive speed. In particular, the present invention relates to walk-behind mowers with an independent hydrostatic transmission for each of two rear wheels carrying a deck containing one or more cutting blades, where the height of the deck is adjustable.

Adjustment of the deck height determines the amount of vegetation that is cut. For example, at golf courses, the fairways are mowed at a much shorter deck height than are the rough or out of bounds. It is also advantageous to be able to adjust the deck height setting on mowers used by homeowners as grass height preferences tend to vary between owners and additionally it is often necessary to adjust the deck height depending on the terrain that is to be mowed. Sloped and uneven ground often requires the use of a higher deck height than level ground. Adjustments of the deck height for walk behind mowers is time consuming. The adjustment requires the engine of the mower to be shut off and, in some cases, manual adjustments of each corner of the deck must be made.

With respect to the rate of travel of the mower, the speed is a function of a transmission control that varies the rate at which fluid is pumped by the hydrostatic transmission. Hydrostatic transmissions are known in the art and include fluid pumps driven by the mower engine, and a hydraulic motor for transforming the hydraulic power into torque and rotation speed for operating the wheels. Once the transmission control is adjusted to a desired rate of travel, the operator activates one or more levers on the mower handle to engage the hydrostatic transmission. The operator then commences walking behind the mower at the operating speed selected. At the end of a cutting pass, the mower is steered to a new cutting direction by operating only one of the hydrostatic drives of the rear wheels. If the mower is to be driven at a higher rate of speed, such as is desirable when moving the mower from one area to a more distant area, the mower is stopped by releasing both transmission engagement levers, readjusting the transmission rate control, and then reengaging the transmission engagement levers.

As time and efficiency are important factors in mowing, improvements in deck height adjustment and drive speed adjustment are needed in walk behind mowers.

BRIEF SUMMARY OF THE INVENTION

The present invention relates to a deck height adjustment apparatus for a walk-behind mower, where the walk-behind mower includes a mower body. A mowing deck is supported by a deck lift mechanism connected to the mower body. A handle is also connected to the mower body, extending rearwardly.

The deck height adjustment apparatus includes a pedal pivotally connected to the mower body near a rear portion of the mower. A lever is operably connected to the pedal and extends at an angle relative to the pedal. The lever is further operably connected to the deck lift mechanism. A cam wheel is rotatably connected to the mower body proximate the lever. The cam wheel includes an outer edge of a varying radius relative to an axis of rotation of the cam wheel.

The lever has a first position in contact with the outer edge of the cam wheel and a second position spaced from the outer edge of the cam wheel. When the lever is in the first position, the deck height is a function of the radius of the outer edge of the cam wheel in contact with the lever. The deck height adjustment apparatus allows an easy and efficient adjustment in the deck height by a user operating the walk-behind mower.

DETAILED DESCRIPTION

Figure 1:
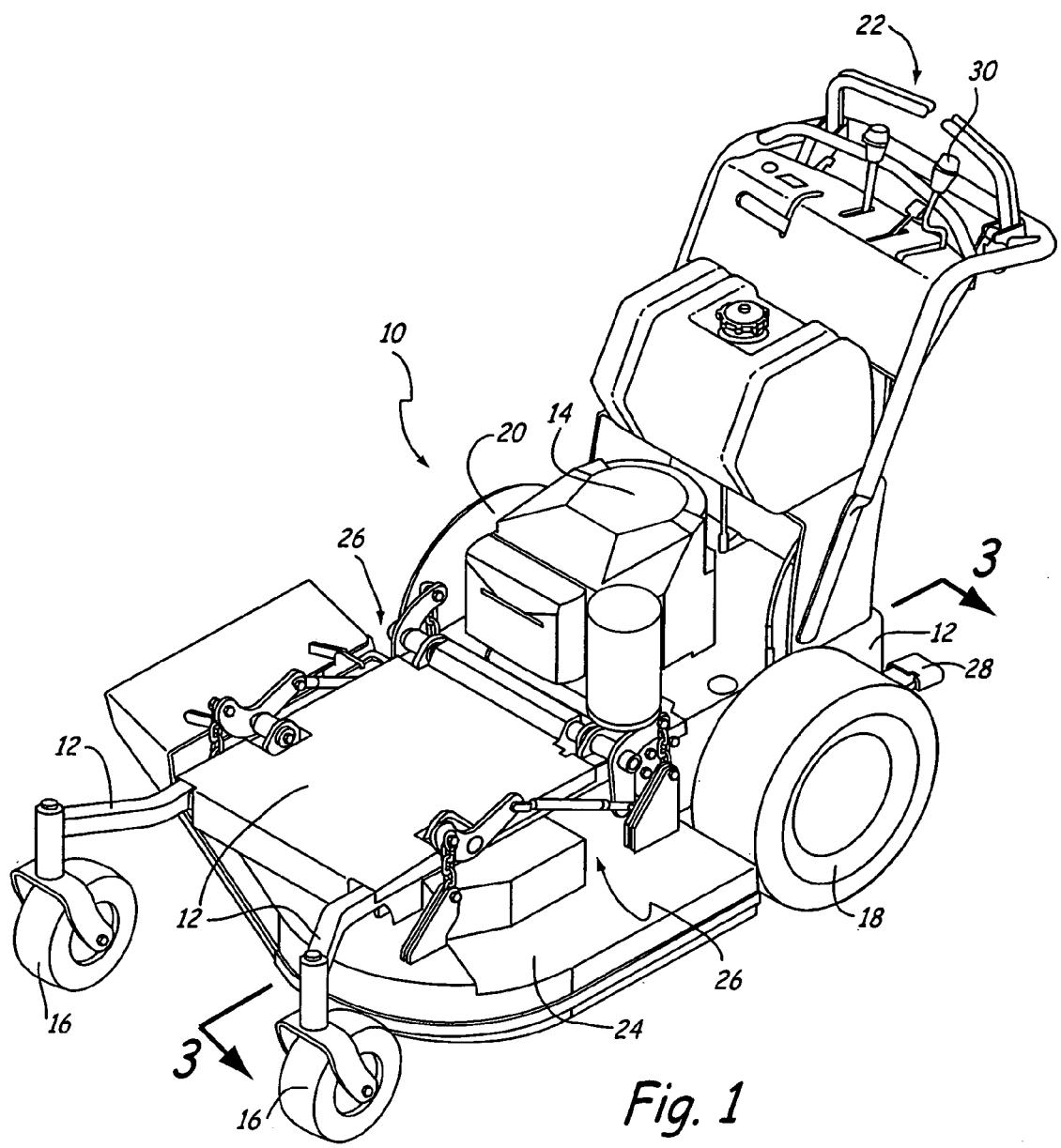
FIG. 1 is a front perspective view of the mower of the present invention.

FIG. 1 is a perspective view of the mower of the present invention, generally referred to as mower 10. Mower 10 is a walk-behind lawn mower that provides both a rapid and efficient system for adjusting the height of deck 24 and an advantageous drive system. As illustrated in FIG. 1, mower 10 generally includes frame 12, engine 14, front wheels 16, left rear wheel 18, right rear wheel 20, handle 22, deck 24, lifting mechanism 26, and foot pedal 28. The designated left and right identifiers refer to components generally viewed from the perspective of an operator operating mower 10.

Frame 12 carries engine 14, which provides power for various mower operations, and handle 22, which supports various controls for mower 10, including a deck height setting control 30. Herein, the term "mower body" generally refers to frame 12 along mower 10, as illustrated in FIG. 1. Deck 24 is supported beneath frame 12 and houses one or more cutting blades that are driven by engine 14. Frame 12 is supported by front wheels 16, left rear wheel 18, and right rear wheel 20. Left rear wheel 18 and right rear wheel 20 are each driven by its own hydrostatic transmission in a manner known in the art. Deck 24 is further associated with lifting mechanism 26, which raises and lowers deck 24. Lifting mechanism 26 is linked to foot pedal 28, which is located at the rear of mower 10.

When an operator desires to adjust the height of deck 24, the operator depresses foot pedal 28, which operates lifting mechanism 26 to raise deck 24. The operator then sets the desired height of deck 24 via deck height setting control 30. The operator then releases foot pedal 28, which allows lifting mechanism 26 to lower deck 24 down until deck 24 reaches the selected height. As such, mower 10 reduces the time and effort required to adjust the height of deck 24, as compared to standard commercial mowers, and provides a safe way to adjust the height of deck 24 without having to shut down engine 14. This allows the operator to mow areas with uneven ground or that require different length cuts much quicker, which saves time, energy, and money.

Figure 2:
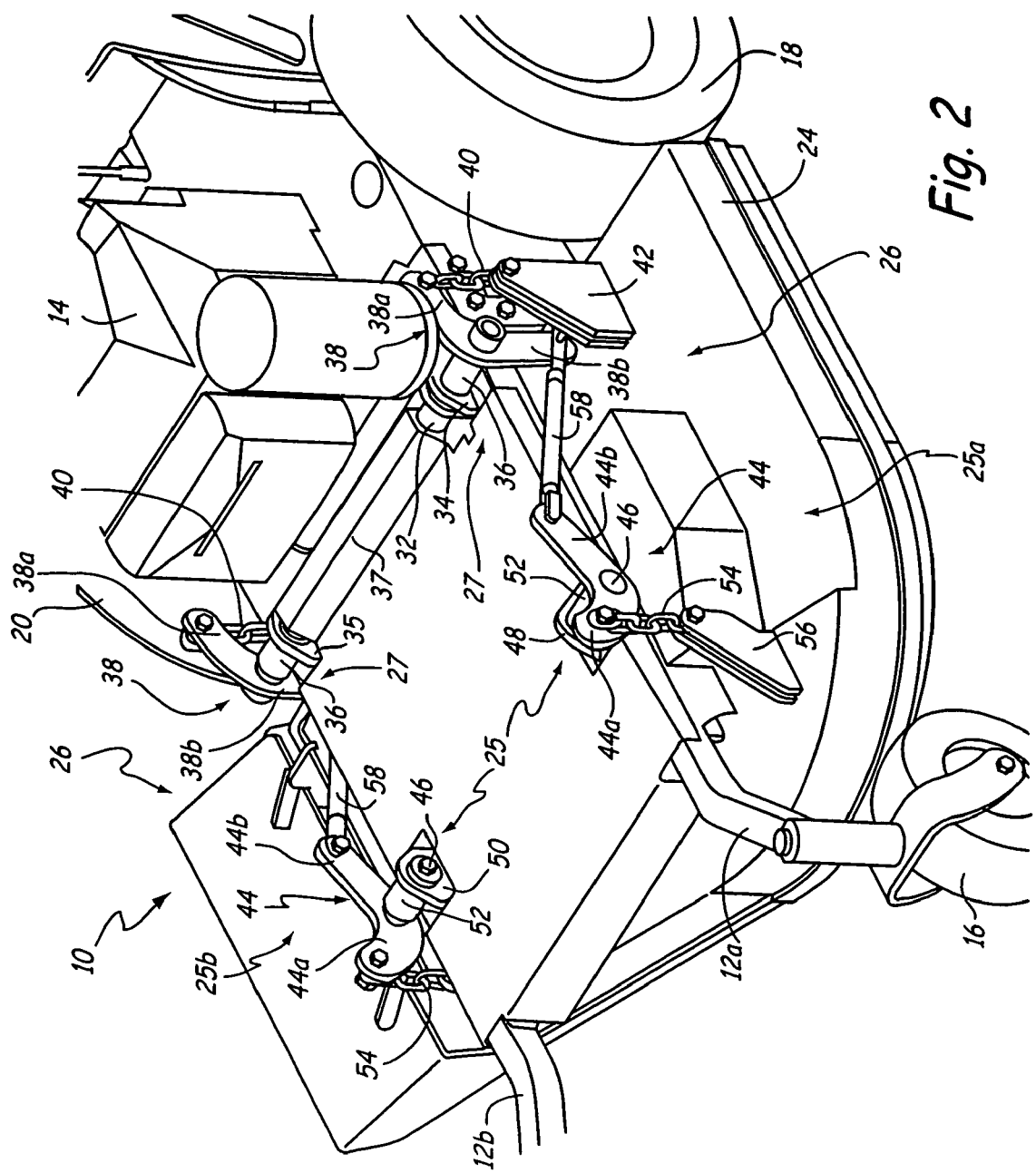
FIG. 2 is an enlarged partial perspective view of the lift mechanism for the mower of the present invention.
Figure 2A:
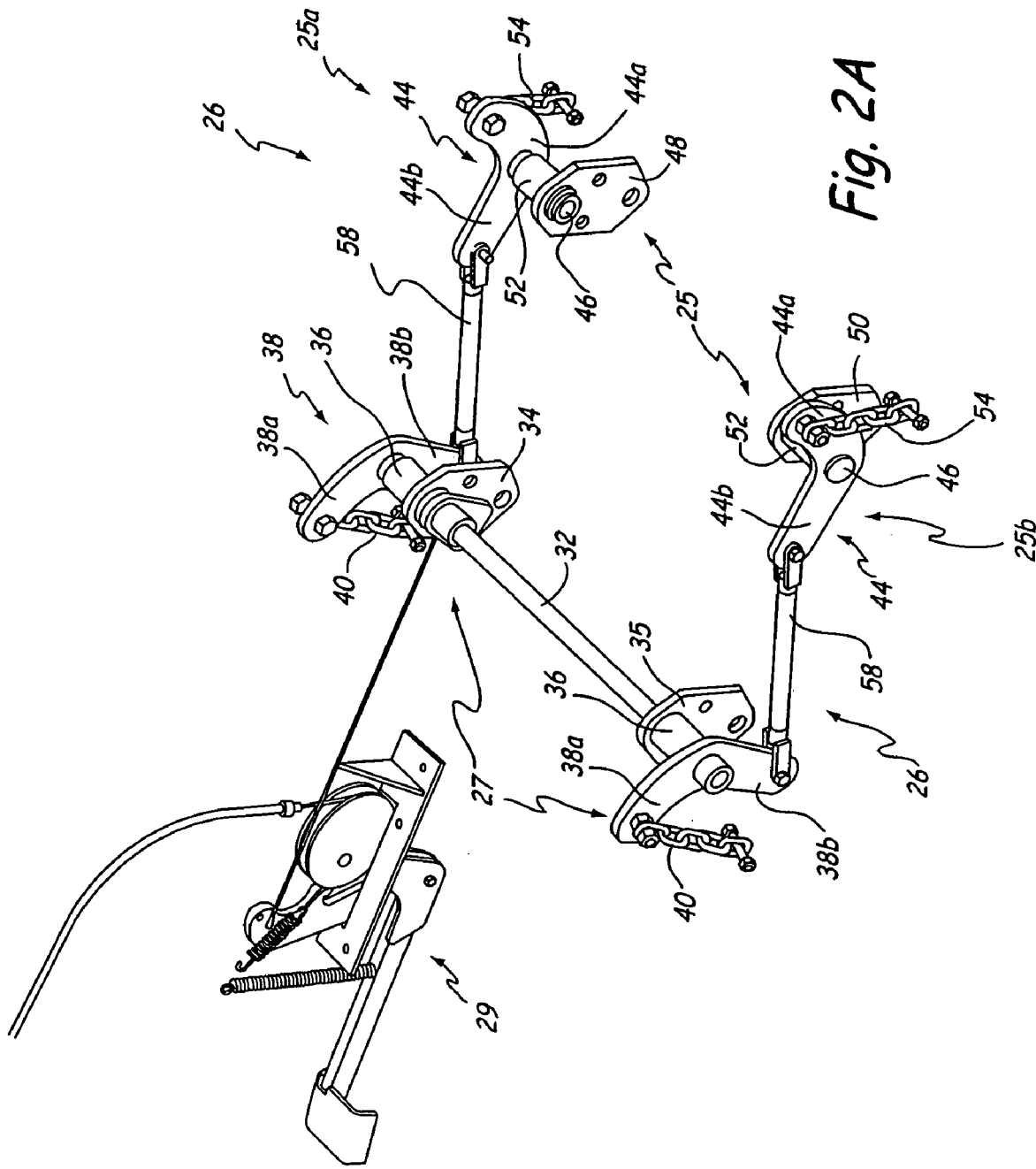
FIG. 2A is a perspective view of the lift mechanism for the mower of the present invention with the mower deck removed.

FIG. 2 is an enlarged partial perspective view of mower 10 illustrating the lifting mechanism 26 for the deck 24. FIG. 2A is a perspective view of the lifting mechanism 26 with the deck 24 removed, in which the lifting mechanism 26 connected to a deck height adjustment apparatus 29. As shown in FIGS. 2 and 2A, the lifting mechanism 26 is comprised of a front lift assembly 25 and a rear lift assembly 27 that is supported between a left frame member 12a and a right frame member 12b. The rear lift assembly 27 includes a shaft 32 that is supported for rotational movement by the rear mounting members 34 and 35 secured to the left and right frame members 12a, 12b, respectively. As shown in FIG. 2, a central portion of the shaft 32 is covered by a shroud 37. Each end of the shaft 32 is connected to the apex of a curved arm 38, having angularly displaced first and second portions 38a and 38b. Curved arms 38 are spaced from the mounting members 34, 35 by spacers 36.

The first portions 38a of curved arms 38 are connected to chains 40 that are in turn secured to brackets 42 mounted to the top of the deck 24. As viewed in FIG. 2, counterclockwise rotation of shaft 32 results in an elevation of first portions 38a and a raising of the rear portion of deck 24.

The front lift assembly 25 comprises a left lift mechanism 25a and a right lift mechanism 25b, which cooperate with the rear lift assembly 27 to provide a coordinated lifting of deck 24. The left and right lift mechanisms 25a, 25b each comprise a curved arm 44 carried by an axle 46 rotationally mounted to front mounting members 48 and 50 that are secured to frame members 12a, 12b. Curved arms 44 are spaced from front mounting members 48, 50 by spacers 52 so that the curved arms 72 of the front lift assembly 25 are longitudinally aligned with the curved arms of the rear lift assembly 27. Like curved arms 38 of the rear lift assembly 27, curved arms 44 have angularly displaced first and second portions 44a and 44b. The first portions 44a are secured to chains 54 that connect to mounting brackets 56 attached to the front of deck 24. As viewed in FIG. 2, a clockwise rotation of axles 46 results in an elevation of the first portion 44a of each curved arm 44 and a consequent lifting of the front of deck 24. The lifting action of the front and rear lifting assemblies 25, 27 is coordinated by linking rods 58, which are pivotally connected between the second portions 38b of curved arms 38 and the second portions 44b of curved arms 44.

Figure 3:
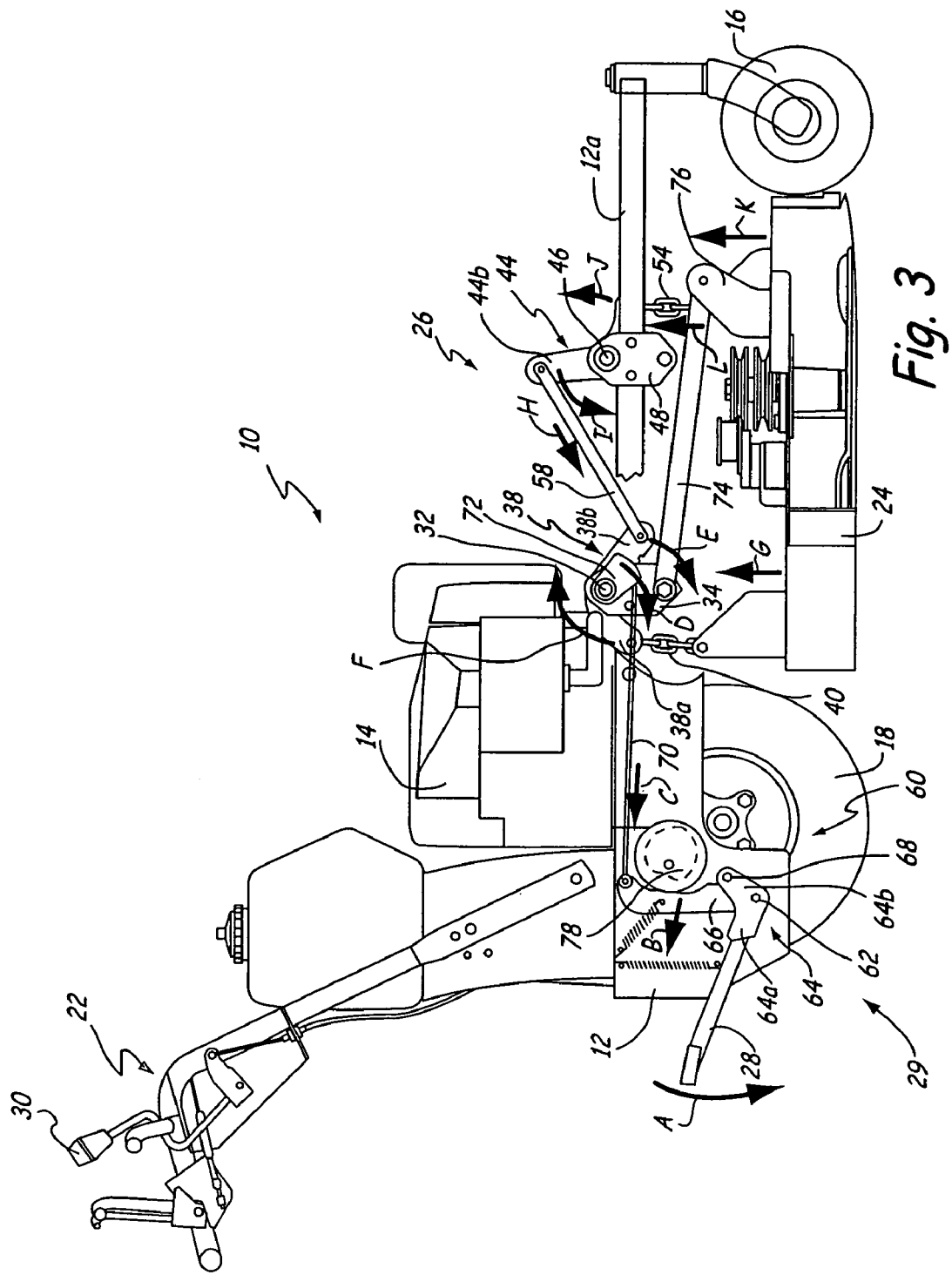
FIG. 3 is a sectional view taken along line A—A in FIG. 1.

FIG. 3 is a cross-sectional view of mower 10 taken along line 3—3 of FIG. 1. As shown in FIG. 3, lift mechanism 26 is connected to a deck height adjustment apparatus 29, which includes foot pedal assembly 60, lever 66, linking member 70, and deck height adjustment cam 78. Lift mechanism 26 is actuated by foot pedal assembly 60, which includes a pivotal connection 62 to a portion of frame 12. Foot pedal assembly 60 comprises foot pedal 28, which is secured to curved arm 64 having a rearward extending portion 64a and a forward extending portion 64b, with the pivotal connection 62 formed at the apex of curved arm 64. Pivotal connection 64 also secures one end of lever 66 relative to curved arm 64. The forward extending portion 64b is provided with a peg 68 which bears against lever 66 when pedal 28 is depressed to move lever 66 in a rearward direction. The opposite end of lever 66 is connected to linking member 70 that in turn is connected to a rotation plate 72 connected to shaft 32.

FIG. 3 illustrates the lifting mechanism 26 and the deck height adjustment apparatus 29 where deck 24 is resting at a low height setting. Deck 24 is raised initially by depressing foot pedal 28, as illustrated by arrow A, which rotates curved arm 64 counterclockwise. Peg 68 on the forward extending portion 64b of curved arm 64 engages lever 66 and urges lever 66 toward the rear of mower 10, as illustrated by arrow B. This correspondingly pulls linking member 70 toward the rear of mower 10, as illustrated by arrow C, which pivots rotation plate 72 and shaft 32 in a clockwise direction, as illustrated by arrow D. The clockwise rotation of shaft 32 causes curved arms 38 to pivot in a clockwise direction, as illustrated by arrows E and F. The clockwise pivoting of curved arms 38 lifts first portions 38a, which correspondingly lift chains 40 and the rear portion of deck 24, as illustrated by arrow G. The clockwise pivoting of rear deck arms 38 also pull second portions 38b downward, which pulls linking rods 58 toward the rear of mower 10, as illustrated by arrow H.

The rearward movement of linking rods 58 pivot curved arms 44 counterclockwise, as illustrated by arrows I and J, resulting in a downward movement of second portions 44b, as illustrated by arrow I. The counter-clockwise pivoting of curved arms 44 lift first portions 44a of curved arms 44, which correspondingly lift chains 54 and the front portion of deck 24, as illustrated by arrow K.

As deck 24 is raised and lowered, deck 24 is maintained in longitudinal alignment with mower 10 by a pair of guide arms 74 on each side of deck 24. Guide arms 74 have first ends pivotally connected to rear mounting members 34 and 35, and second ends pivotally secured to deck 24 by mounting brackets 76. Guide arms 74 provide additional connections between frame 12a, 12b, and deck 24 to inhibit horizontal swinging motion, and allow deck 24 to be raised in alignment with the longitudinal axis of mower 10. As deck 24 is raised, guide arms 74 are also raised at the end connected to mounting brackets 76, as illustrated by arrow L.

Lifting mechanism 26 allows the operator to raise and lower deck 24 with little time and effort. Deck 24 is easily and conveniently raised and lowered by actuating foot pedal 28. The operator merely depresses foot pedal 28 to lift deck 24 to full height, and releases foot pedal 28 to allow deck 24 to lower down to the desired height. As will be described, the height of deck 28 may be varied by deck height adjustment cam 78 that is actuated by the deck height setting control 30 carried by handle 22 of mower 10. The deck height adjustment can be performed while mower 10 is still running and does not require the operator to stop mower 10 and adjust each corner of deck 24 to a new height.

Figure 4:
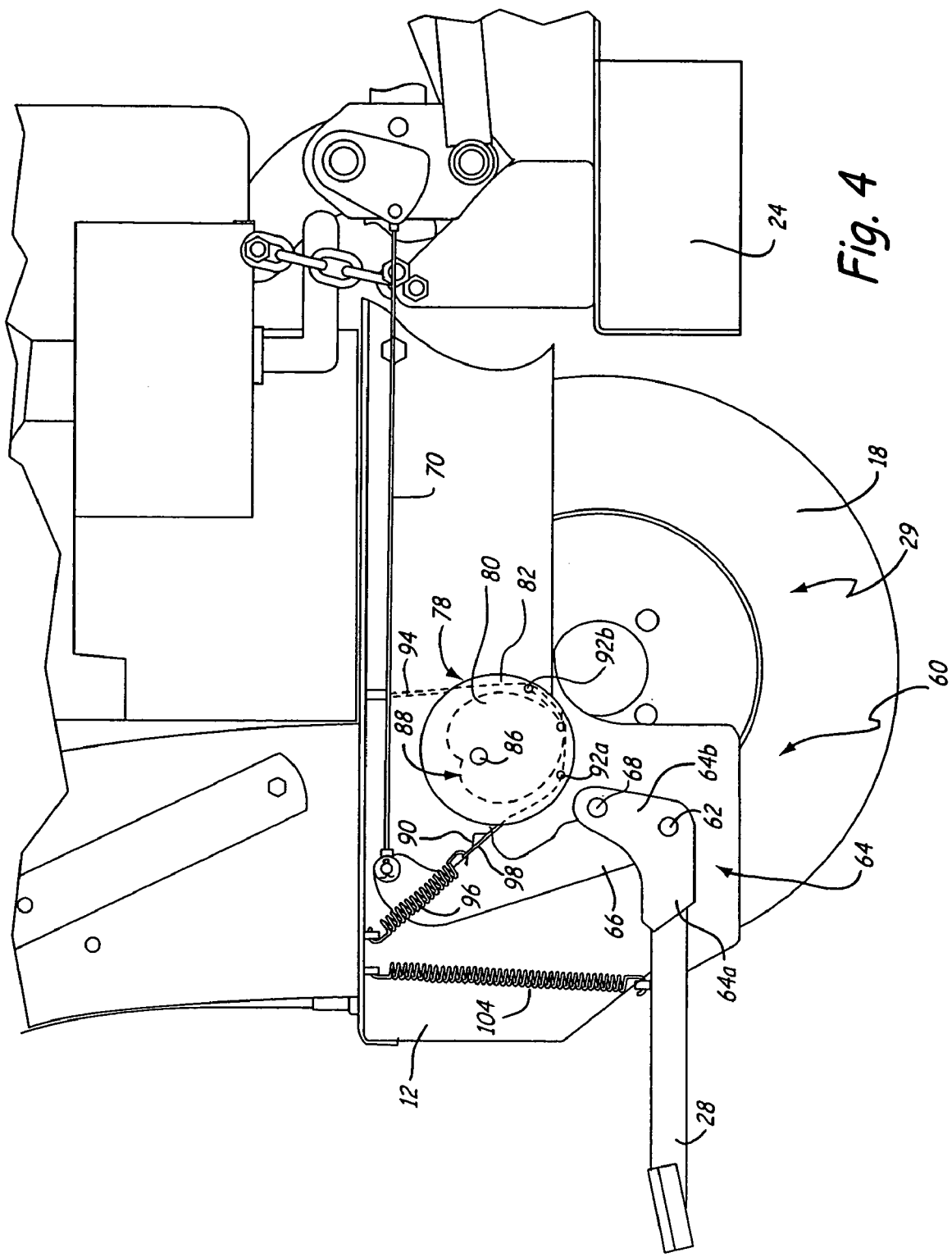
FIG. 4 is an enlarged view of the deck height setting mechanism of the present invention.
Figure 5:
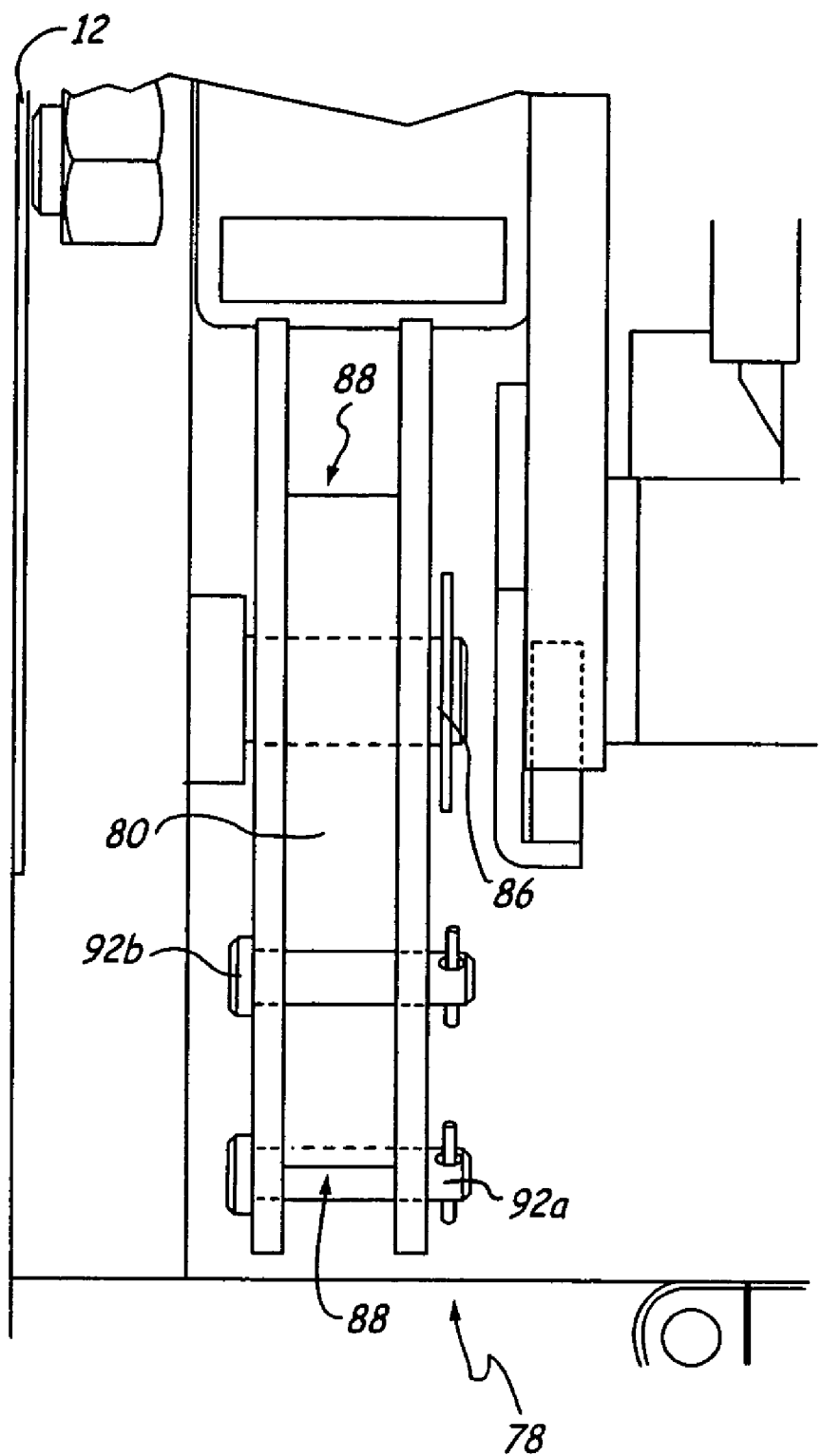
FIG. 5 is a rear view taken of the deck height setting cam of the present invention.

FIG. 4 is an enlarged view of the foot pedal assembly 60 of FIG. 3 with deck height setting cam 78, which is a rotational cam mechanism utilized for setting and maintaining a desired height of deck 24. As shown in FIGS. 4 and 5, deck height setting cam 78, which is comprised of a cam wheel 80 secured between opposing plates 82, 84 is provided with an eccentrically positioned axle 86 that is rotatably connected to frame 12. Cam wheel 80 has an outer edge surface 88 of a varying radius relative to axle 86 of the deck height setting cam 78, where axle 86 defines an axis of rotation of cam wheel 80. The outer edge surface 88 of cam wheel 80 is aligned for engagement with a protrusion 90 of lever 66 so that the range of forward movement of lever 66 is a function of the outer edge portion of cam wheel 80 oriented toward protrusion 90.

Deck height setting cam 78 is rotated by deck height control 30 on handle 22 (shown in FIG. 1). Any suitable mechanical actuator positioned relative to the handle 22, such as a pneumatic cylinder, a gas-filled cylinder, a ball screw, a chain drive, a rack, a worm gear, or an electric motor, may be used to rotate the cam wheel 80. In one embodiment, shown in FIGS. 4 and 5, deck height setting cam 78 includes a plurality of radially spaced pins 92 extending between the opposing plates 82, 84 generally adjacent to an edge portion of cam wheel 80 having the greatest radius. A deck height setting cable 94 controlled by deck height setting control 30 is connected to end pin 92*a* such that as deck height setting cable 94 extends (i.e., lengthens) relative to frame 12, cam wheel 80 rotates clockwise, and when the deck height setting cable 94 retracts (i.e., shortens) relative to frame 12, the cam wheel 80 rotates counterclockwise. A spring 96 connected by a cable 98 to pin 92*b* assists the deck height setting cam 78 in rotating clockwise when deck height setting cable 94 is extended. As shown if FIGS. 4 and 5, the plurality of radially spaced pins 92 define a curved shoulder. In an alternative embodiment, the curved shoulder may be a unitary wall structure extending between the opposing plates 82, 84.

Figure 5A:
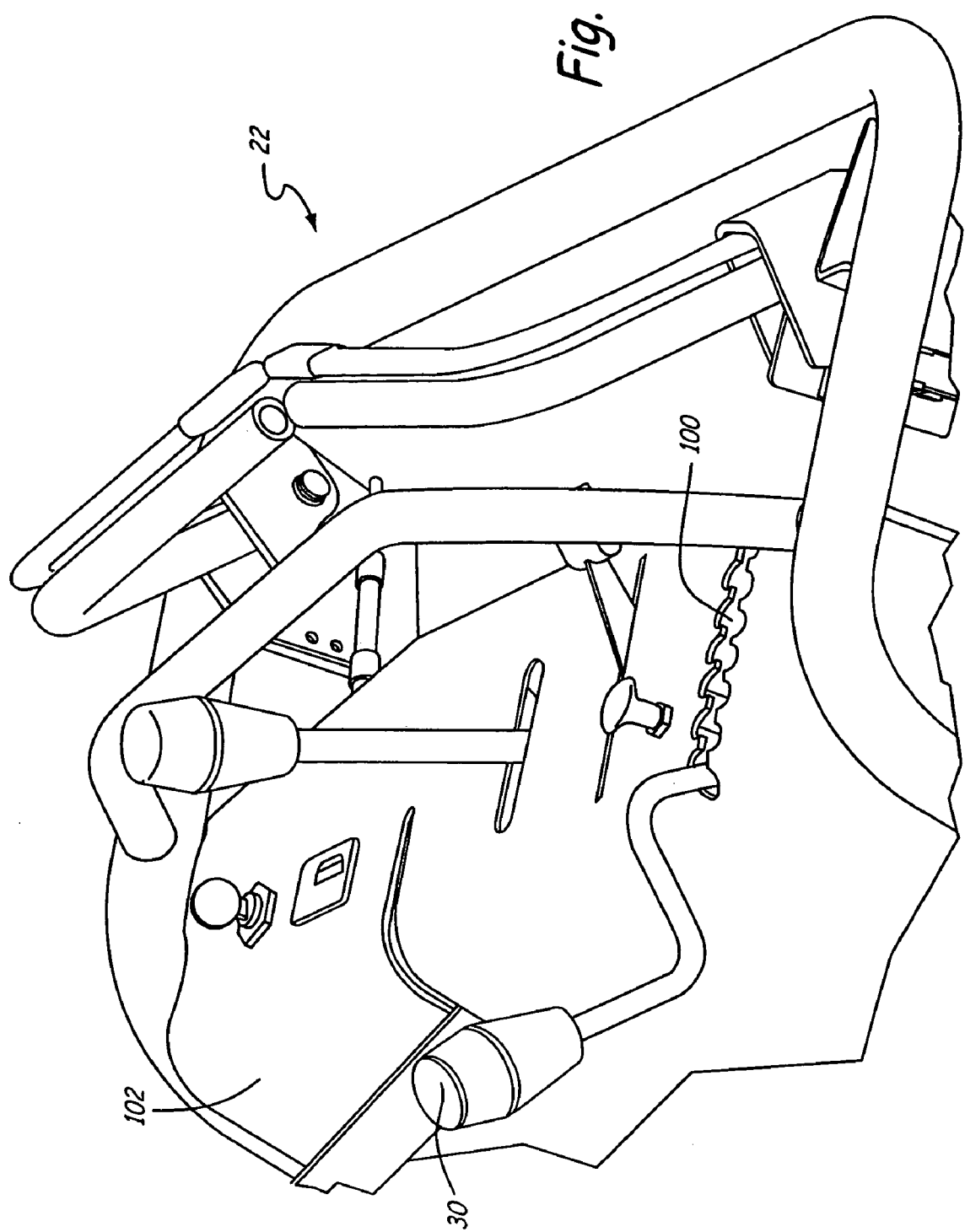
FIG. 5A is an enlarged view of the deck height setting cam of the present invention.

The length of the deck height setting cable 94 is determined by the selected settings of deck height setting control 30 on handle 22. As illustrated in FIG. 5*a*, which is an enlarged view of handle 22, deck height setting control 30 extends through a slot 100 in panel 102 containing deck height setting notches for holding deck height setting control 30 at various positions along slot 100. The notches may be labeled to designate the incremental heights of deck 24. When deck height setting control 30 is shifted forward along the slot 100 toward the front of mower 10, as shown in FIG. 5A, deck height setting cable 94 extends from frame 12, allowing cam wheel 80 to rotate clockwise. Similarly, when deck height control 40 is shifted along the slot 100 toward the rear of mower 10, deck height setting cable 94 retracts to frame 12, allowing cam wheel 80 to rotate counterclockwise.

Figure 6:
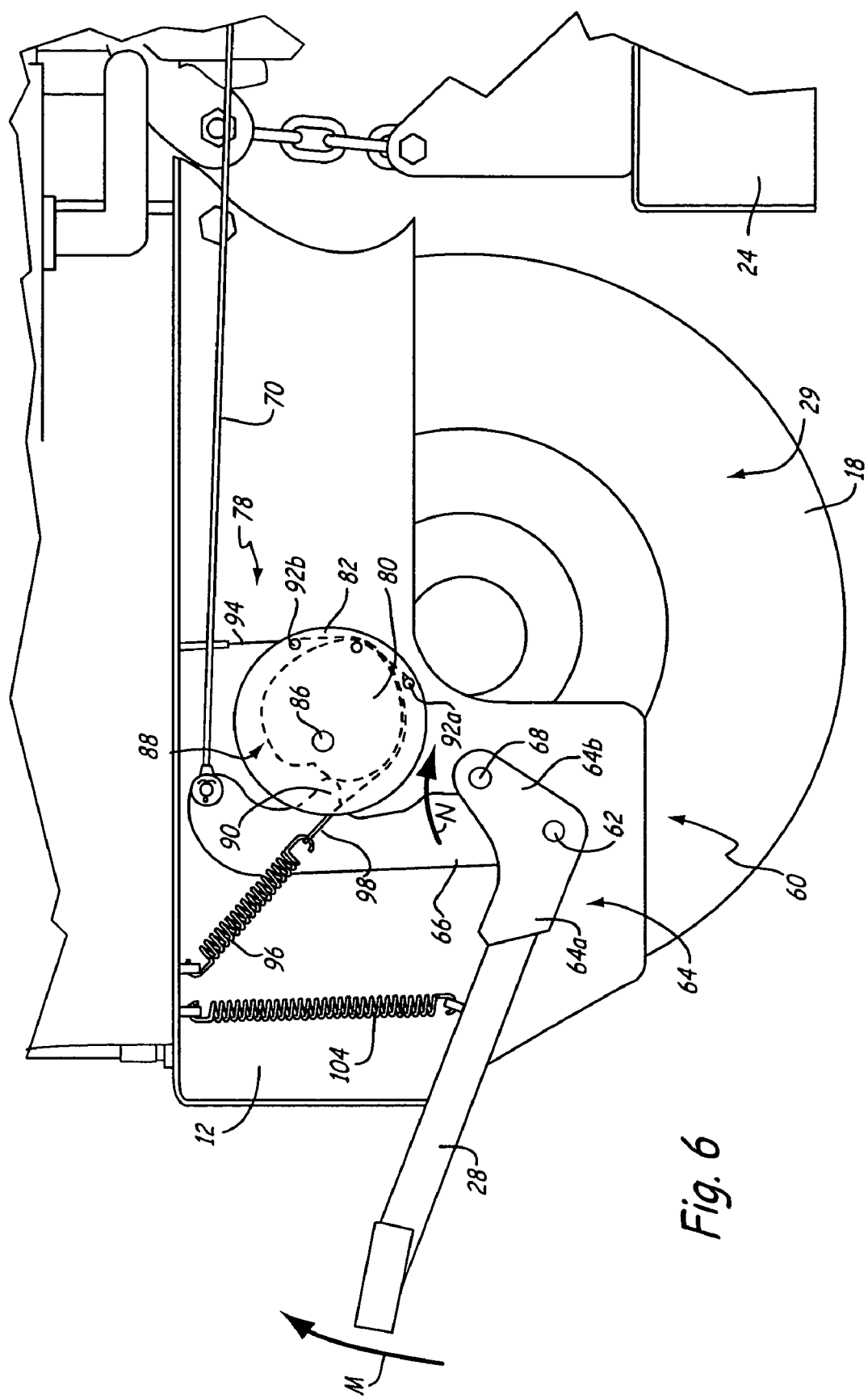
FIG. 6 is an enlarged view of the deck height setting mechanism of the present invention.

As shown in FIG. 4, with pedal 28 fully depressed, lever 66 is urged rearward and, as previously described, deck 24 is elevated. As shown in FIG. 6, when pedal 28 is released, a return spring 104 connected between pedal 28 and frame 12 urges pedal 28 to a raised position, as illustrated by arrow M. Foot pedal 28 returns to a position that is generally out of the way during normal use, but is ready to be depressed when needed. This accordingly allows lever 66 to travel forward in the direction of arrow N (and deck 24 lowers) until the protrusion 90 engages an edge portion of cam wheel 80. The height of deck 24 is thereby maintained according to the relative position of the deck height setting cam 78. As the radius of the outer edge 88 of cam wheel 80 oriented toward protrusion 90 increases by clockwise rotation of the deck height setting cam 78, the height at which deck 24 will be maintained increases. The deck height of mower 10 is thereby easily and quickly enabled by the deck height adjustment mechanism of the present invention.

As described above, mower 10 is a walk-behind lawn mower that provides a rapid and efficient system for adjusting the height of deck 24. The deck height adjustment system allows the operator to adjust the height of deck 24 without shutting down engine 14, and without having to manually adjust individual corners of deck 24, which is tedious and time consuming. Although the present invention has been described with reference to preferred embodiments, workers skilled in the art will recognize that changes may be made in form and detail without departing from the spirit and scope of the invention.

The invention claimed is:

1. A walk-behind mower comprising:
   a mower body;
   a deck lift mechanism connected to the mower body;
   a mowing deck connected to and supported by the deck lift mechanism;
   a handle connected to the mower body and extending rearwardly; and
   a deck height adjustment apparatus for defining a height of the mowing deck above a ground surface, the deck height adjustment apparatus comprising:
   a pedal pivotally connected to the mower body near a rear portion of the mower;
   a lever operably connected to the pedal, the lever extending at an angle relative to the pedal, the lever being further operably connected to the deck lift mechanism; and
   a cam wheel rotatably connected to the mower body proximate to the lever, the cam wheel comprising an axis of rotation and an outer edge of a varying radius relative to the axis of rotation;
   wherein the lever has a first position in contact with the outer edge of the cam wheel and a second position spaced from the outer edge of the cam wheel, and wherein the deck height is a function of the radius of the outer edge of the cam wheel in contact with the lever when the lever is in the first position.

2. The walk-behind mower of claim 1, wherein the pedal comprises a first portion extending in a first direction, a second portion extending at an angle relative to the first portion, and an intersection of the first portion and the second portion, and wherein the pedal is pivotally connected to the mower body at the intersection.

3. The walk-behind mower of claim 2, wherein the lever is pivotally connected to the pedal at the intersection.

4. The walk-behind mower of claim 3, wherein the pedal comprises a peg extending generally normal to the second portion of the pedal, the peg engaging the lever when a force is applied to the pedal to move the lever to the second position.

5. The walk-behind mower of claim 4, wherein the lever further comprises a second end operably connected to the deck lift mechanism.

6. The walk-behind mower of claim 5, wherein the lever further comprises a leading edge oriented toward the cam wheel and a protrusion extending from the leading edge for contacting the outer edge of the cam wheel.

7. The walk-behind mower of claim 6, wherein the deck lift mechanism comprises a shaft rotatably connected to the mower body, the deck lift mechanism being spaced from the lever, wherein the shaft comprises an arm extending generally normal to a longitudinal axis of the shaft, and wherein the lever is operably connected to the arm of the shaft.

8. The walk-behind mower of claim 1 further comprising a mechanical actuator operably connected to the cam wheel, the mechanical actuator located relative to the handle for rotating the cam wheel.

9. The walk-behind mower of claim 8 further comprising a cable connected between the lever and the arm of the shaft.

10. The walk-behind mower of claim 8, wherein the mechanical actuator comprises a deck height setting control lever connected to the handle and a first cable connected between the deck height setting control lever and the cam wheel.

11. The walk-behind mower of claim 10 further comprising a panel carried by the handle, the panel having a slot for receiving and permitting movement of the deck height setting control lever therein, the slot further comprising a plurality of notches for retaining a position of the deck height setting control lever, each of the plurality of notches being representative of a deck height.

12. The walk-behind mower of claim 11 further comprising a pair of plates, each plate of the pair of plates having a diameter larger than a diameter of the cam wheel, wherein the cam wheel is positioned between and secured to the pair of plates, wherein the pair of plates have an axis of rotation common with the axis of rotation of the cam wheel.

13. The walk-behind mower of claim 12 further comprising a curved shoulder extending between the pair of plates, wherein the first cable is connected to the curved shoulder, the first cable having a first portion extending in a first direction over the curved shoulder.

14. The walk-behind mower of claim 13 further comprising a second cable connected to the curved shoulder, the second cable having a first portion extending in a second direction opposite the first direction over the curved shoulder.

15. The walk-behind mower of claim 14, wherein the curved shoulder comprises a plurality of radially spaced pins.

16. A walk-behind mower comprising:
   a mower body;
   a deck lift mechanism connected to the mower body;
   a mowing deck connected to and supported by the deck lift mechanism;
   a handle connected to the mower body and extending rearwardly; and
   a deck height adjustment apparatus for defining a height of the mowing deck above a ground surface, the deck height adjustment apparatus comprising:
      a foot pedal pivotally connected to the mower body;
      a lever having a first portion operably connected to the pedal and pivotable in a plane common with the foot pedal, the lever having a second portion operably connected to the deck lift mechanism;
      a cam wheel rotatably connected to the mower body proximate to the lever, the cam wheel comprising an axis of rotation and an outer edge of a varying radius relative to the axis of rotation; and
      a mechanical actuator located relative to the handle and operably connected to the cam wheel;
      wherein the lever has a first position in contact with the outer edge of the cam wheel and a second position spaced from the outer edge of the cam wheel, and wherein the deck height is a function of the radius of the outer edge of the cam wheel in contact with the lever when the lever is in the first position.

17. The walk-behind mower of claim 16 further comprising a pair of plates, each plate of the pair of plates having a diameter larger than a diameter of the cam wheel, wherein the cam wheel is positioned between and secured to the pair of plates, wherein the pair of plates have an axis of rotation common with the axis of rotation of the cam wheel.

18. The walk-behind mower of claim 17 further comprising a curved shoulder extending between the pair of plates, and a first cable connected to curved shoulder, the first cable having a first portion extending in a first direction over the curved shoulder.

19. The walk-behind mower of claim 18 further comprising a second cable connected to the curved shoulder, the second cable having a first portion extending in a second direction opposite the first direction over the curved shoulder.

20. The walk-behind mower of claim 19, wherein the curved shoulder comprises a plurality of radially spaced pins.

21. The walk-behind mower of claim 20 further comprising a biasing spring having a first portion connected to the mower body and a second portion connected to the second cable.

22. The walk-behind mower of claim 16, wherein the mechanical actuator comprises a deck height setting control lever connected to the handle and a first cable connected between the deck height setting control lever and the cam wheel.

23. The walk-behind mower of claim 22 further comprising a panel carried by the handle, the panel having a slot for receiving and permitting movement of the deck height setting control lever therein, the slot further comprising a plurality of notches for retaining a position of the deck height setting control lever, each of the plurality of notches being representative of a deck height.

24. The walk-behind mower of claim 16, wherein the lever further comprises a leading edge oriented toward the cam wheel and a protrusion extending from the leading edge for contacting the outer edge of the cam wheel.

25. The walk-behind mower of claim 24 further comprising a cable connected between the lever and the deck lift mechanism.

* * * * *